3,035,929
PROCESS OF PREPARATION OF REFRACTORY PRODUCTS CONTAINING ZIRCONIA, ALUMINA AND SILICA
Christian Hine, Sorgues, and André Mendes da Costa, Le Pontet, France, assignors to L'Electro Refractaire, Paris, France, a company of France
No Drawing. Filed Feb. 17, 1959, Ser. No. 793,699
Claims priority, application France Feb. 18, 1958
4 Claims. (Cl. 106—57)

The present invention concerns obtaining electrically melted refractory products containing zirconia, alumina and silica, capable of having a high content of the first and a low content of the third, the content of extraneous oxides, such as iron oxide, being very small and innocuous.

It is known that refractory products with a high zirconia content can be manufactured using brazilites (such as zircites) as a basis, but these minerals have the disadvantage of containing a high proportion of iron oxide, which can reach 9%, which is very harmful, particularly when it is a question of making refractories which have to come into contact with molten glass.

The process forming the subject of the invention permits the preparation, in a simple industrial manner, of refractories of the type under consideration having a low content of harmful impurities. Although it is particularly advantageous for products having a high content of zirconia, it lends itself to the production of wide ranges of contents.

It is characterised by the fact that at least a part of the zirconia intended to form part of the composition of the products is prepared starting from zircon (natural zirconium silicate) of which a part of the silica is eliminated by reduction in a suitable furnace, preferably an electric one, in the presence of at least part of the alumina which is to form part of the composition of the product.

The reducer is charcoal, for preference, but other reducers, such as Al or coke can be used.

The alumina present during the reduction, in a proportion of about 5 to 12% of the charge, plays the part of a flux and renders the operation industrially practicable by allowing lower temperatures to be used than when it is not present, thus lessening the wear on the furnace.

As a non-restrictive example, charges of:

| | |
|---|---|
| Zircon ($SiO_2$, $ZrO_2$) parts by weight | 90 |
| Calcined alumina do | 5 to 15 |
| Charcoal parts | 10 | after fusion in a Heroult type electric furnace and accompanying reduction of the silica by charcoal with volatilisation of silicon, have given cast products with the following analysis:

| | Percent |
|---|---|
| $ZrO_2$ | 75 to 85 |
| $SiO_2$ | 2 to 8 |
| $Al_2O_3$ | 9 to 17 |
| Extraneous oxides | 0.5 to 0.7 |

The variations in analyses are particularly brought about by variations of the electric power used for the same charge. This product, rich in zirconia and relatively poor in silica, can be used as raw material which, by further fusion and the addition of calcined alumina and/or zircon, permits coverage industrially, according to requirements, of wide ranges of compositions containing: $Al_2O_3$—$ZrO_2$—$SiO_2$ (and also containing, if required, other added constituents, with the minimum of harmful impurities, the initial zircon in the charge subjected to reduction being capable of being fairly pure.

For example, a refractory product is known which has given good results, more particularly for forming the lining of the furnaces, apparatuses and parts thereof which are to be in contact with fused glass. This product has the following composition:

| | Percent |
|---|---|
| $ZrO_2$ | 33 |
| $Al_2O_3$ | 51 |
| $SiO_2$ | 13.5 |

Up to now, this product was prepared by fusing, in an electric furnace, batches having the desired proportions of a zirconia-rich mineral such as brazilite or natural zircite, of alumina and of silica.

In accordance with the invention, the brazilite is replaced by artificial zircite prepared by reduction of the silica from zircon as set forth above.

By taking about 10 parts by weight of this previously crushed zircite, by adding to it about 37 parts of zircon sand and about 53 parts of calcined alumina, then by fusing in an electric furnace the batch thus formed, the applicants have obtained a refractory product having the above-defined composition and properties. For the second fusion, alumina was added again to the artificial zircite which has itself been prepared by reduction of zircon in the presence of a part of the alumina to be contained in the final product. The reduction of zircon could have been effected in the presence of the whole alumina in order to avoid two successive fusions, but this method of operation would be bad. The applicants have indeed noticed that too great an alumina content gives rise to various defects, in particular the formation of a eutectic with zirconia, and this eutectic has too low a melting point for allowing proper reduction of silica which is better carried out at higher temperatures.

Another refractory product of interest contains: 40% $ZrO_2$, 50% $Al_2O_3$, 8% $SiO_2$.

It may be obtained by mixing 30 parts by weight of artificial zircite prepared as above and adequately crushed, 22 parts of zircon sand and 48 parts of calcined alumina, then by fusing this batch in an electric furnace.

The two examples which have been given are of course not exhaustive.

What we claim is:

1. A method of preparing a refractory product consisting essentially of zirconia, alumina and silica, said method comprising the successive steps of first fusing a first batch containing natural zircon, a carbonaceous reducing agent and a portion of the alumina content of said refractory product, which portion is sufficient to reduce the fusion temperature of the batch while maintaining said temperature in the silica reduction range, to obtain an artificial zircite having a substantially higher zirconia content and a substantially lower alumina content compared with said refractory product, and then fusing a second batch containing said artificial zircite and the remainder of the alumina content of said refractory product.

2. A method according to claim 1, wherein said first batch contains about 5 to 12% alumina.

3. A method according to claim 1, wherein said reducing agent is charcoal and the proportions by weight of zircon, charcoal and alumina in said first batch are about 90:10: and 5 to 15 respectively.

4. A method according to claim 1, wherein said second batch includes further natural zircon in addition to artificial zircite and alumina.

References Cited in the file of this patent
UNITED STATES PATENTS

| | | |
|---|---|---|
| 2,271,367 | Fulcher et al. | Jan. 27, 1942 |
| 2,624,097 | Kistler | Jan. 6, 1953 |

OTHER REFERENCES
Rea: J. Am. Ceram. Soc., vol. 22, 1939, pp. 95–96.